(12) United States Patent
Huang (10) Patent No.: US 7,661,951 B2
(45) Date of Patent: Feb. 16, 2010

(54) APPARATUS FOR INJECTION MOLDING (75) Inventor: Chien-Feng Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 88 days.

(21) Appl. No.: 11/967,001

(22) Filed: Dec. 29, 2007

(65) Prior Publication Data
US 2008/0286404 A1    Nov. 20, 2008

(30) Foreign Application Priority Data
May 17, 2007    (CN)    .................... 2007 1 0200629

(51) Int. Cl.
*B29C 45/40* (2006.01)
*B29C 45/44* (2006.01)

(52) U.S. Cl. .............. 425/556; 425/436 RM; 425/444

(58) Field of Classification Search .......... 425/436 R, 425/436 RM, 438, 441, 442, 556, DIG. 51, 425/444
See application file for complete search history.

(56) References Cited

U.S. PATENT DOCUMENTS

| | | | | |
|---|---|---|---|---|
| 2,759,221 A | * | 8/1956 | Edwards | ...................... 425/140 |
| 3,669,592 A | * | 6/1972 | Miller | .......................... 425/155 |
| 3,776,675 A | * | 12/1973 | Veneria | ....................... 425/139 |
| 3,907,483 A | * | 9/1975 | York | ...................... 425/436 R |
| 3,986,811 A | * | 10/1976 | Gunnels, Jr. | ................. 425/556 |
| 4,124,352 A | * | 11/1978 | Pasch | .......................... 425/556 |
| 4,295,815 A | * | 10/1981 | Eltvedt | ......................... 425/556 |
| 4,719,059 A | * | 1/1988 | Braun et al. | ................ 264/40.1 |
| 4,732,554 A | * | 3/1988 | Hellmann | .................... 425/139 |
| 4,741,687 A | * | 5/1988 | Eltvedt | ......................... 425/441 |
| 4,781,571 A | * | 11/1988 | Heindl et al. | ................ 425/556 |
| 4,946,357 A | * | 8/1990 | Harrison | ...................... 425/182 |
| 6,648,626 B1 | * | 11/2003 | Eltvedt | ...................... 425/436 R |
| 6,971,867 B2 | * | 12/2005 | Ihara et al. | ................ 425/403.1 |
| 2005/0208174 A1 | * | 9/2005 | Hartley | ......................... 425/556 |

* cited by examiner

*Primary Examiner*—Yogendra Gupta
*Assistant Examiner*—Emmanuel S Luk
(74) *Attorney, Agent, or Firm*—Frank R. Niranjan (57) ABSTRACT

An injection molding apparatus for injection molding a component includes a first mold half, a second mold half, an eject pin, a receiving container and a blocking device. The second mold half is placed opposite to the first mold half. The eject pin penetrates through the first mold half. The receiving container is placed below the first mold half and the second half. The receiving container is configured for receiving the molding component. The blocking device is movable relative to the first mold half to face toward the first mold half. The blocking device is configured for blocking the molding component when the eject pin ejects the component out from the first mold half.

11 Claims, 9 Drawing Sheets

```
┌─────────────────────────────────────────────────────┐
│ An injection molding apparatus as described above is│
│ provided and locked                                 │
└─────────────────────────────────────────────────────┘
                          │
                          ▼
┌─────────────────────────────────────────────────────┐
│ An injection material is injected into the cavity   │
│ through the second stationary platen and the second │
│ mold half, and the injection material is cured to   │
│ form a molding component                            │
└─────────────────────────────────────────────────────┘
                          │
                          ▼
┌─────────────────────────────────────────────────────┐
│ The injection molding apparatus is unloaded and the │
│ molding component is left                           │
└─────────────────────────────────────────────────────┘
                          │
                          ▼
┌─────────────────────────────────────────────────────┐
│ A blocking device and a receiving container are     │
│ provided. The blocking device is placed facing      │
│ towards the first mold half.  The receiving         │
│ container is placed at one side of and below the    │
│ second mold half                                    │
└─────────────────────────────────────────────────────┘
                          │
                          ▼
┌─────────────────────────────────────────────────────┐
│ The component is ejected out of the cavity and falls│
│ into the receiving container.  The blocking device  │
│ blocks and buffers the component in this step       │
└─────────────────────────────────────────────────────┘
```

APPARATUS FOR INJECTION MOLDING

BACKGROUND

1. Technical Field

The present invention relates to molding apparatuses and, particularly, to an injection molding apparatus.

2. Description of Related Art

Molding apparatuses are widely used for manufacturing optical articles, such as light guide plates, lenses, and so on. Generally, a molding method using the molding apparatuses includes a knockout process.

Figure 9:
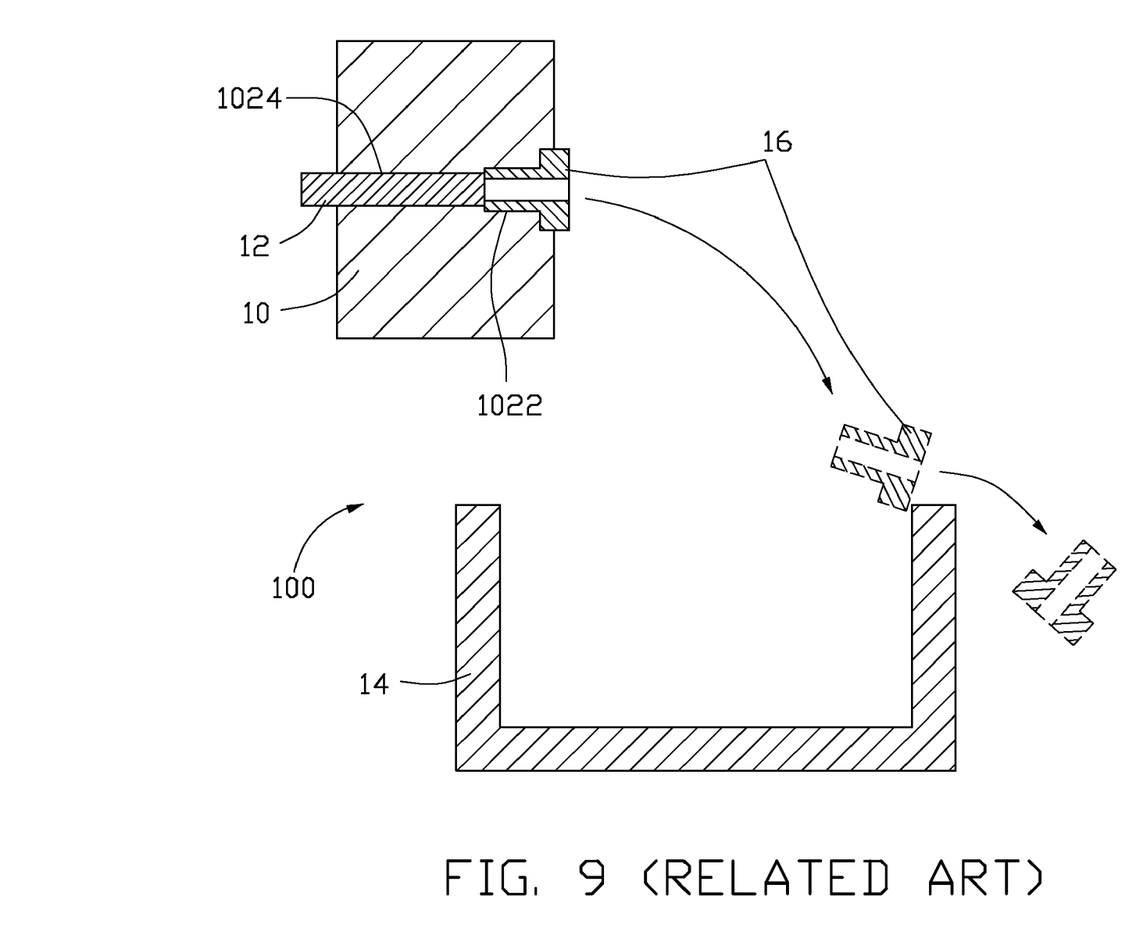
FIG. 9 is schematic, cross-sectional view of a knockout process of a conventional injection molding apparatus.

Referring to FIG. 9, an injection molding apparatus 100 includes a core 10, an eject pin 12 and a receiving container 14. The core 10 defines a molding cavity 1022 therein. A molding component 16 is received in the molding cavity 1022. A through hole 1024 is defined in the core 10 and intercommunicates with the molding cavity 1022. The eject pin 12 passes through the through hole 1024 and touches the molding component 16 to eject the molding component 16 out of the molding cavity 1022. The receiving container 14 is located at one side of and below the molding cavity 1022. The receiving container 14 is configured for collecting the molding component 16 ejected out of the molding cavity 1022. A knockout process of the molding component 16 from the molding cavity 1022 using the eject pin 12 is described as below: firstly, the eject pin 12 moves towards the molding component 16 and knocks the molding component 16 out from the molding cavity 1022; then the molding component 16 falls into the receiving container 14.

Figure 1:
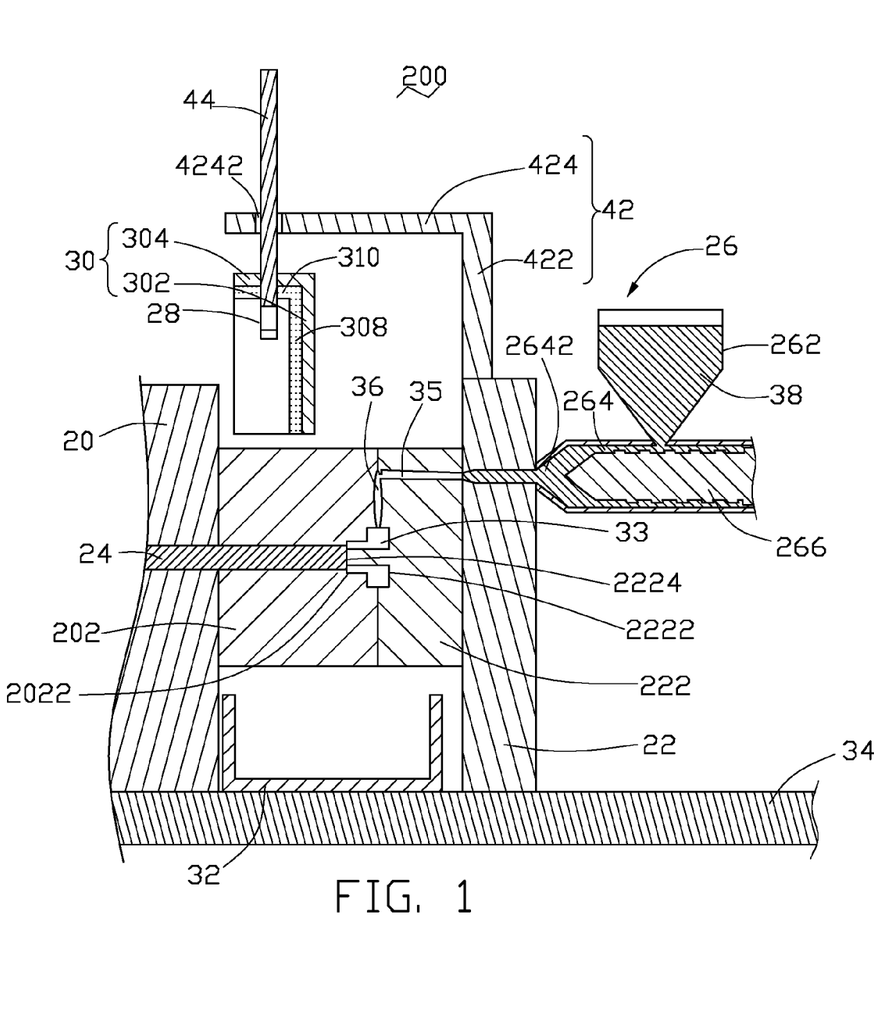
FIG. 1 is schematic, cross-sectional view of a injection molding apparatus according to a first embodiment of the present invention, wherein the injection molding apparatus includes a stub bar stripper and a blocking device, and a molding cavity defined therein.

However, the molding component 16 may be ejected out with a large force that the molding component 16 may be disposed beyond the receiving containers 14 (see broken lines in FIG. 1). Sometimes, the molding component 16 may be broken because of that.

What is needed, therefore, is an injection molding apparatus can prevent the molding components from being broken.

SUMMARY

In a first present embodiment, an injection molding apparatus for injection molding a component includes a first mold half, a second mold half, an eject pin, a receiving container and a blocking device. The second mold half is placed opposite to the first mold half. The eject pin penetrates through the first mold half. The receiving container is placed below the first mold half and the second half. The receiving container is configured for receiving the molding component. The blocking device is movable relative to the first mold half to face toward the first mold half. The blocking device is configured for blocking the molding component when the eject pin ejects the component out from the first mold half.

In a second present embodiment of the present invention, an injection molding apparatus includes a first mold half, a second mold half, an eject pin, a runner stripper and a blocking member. The second mold half is disposed opposite to the first mold half. The first mold half and the second mold half cooperatively define a runner channel and a molding cavity in communication with the runner channel. The runner channel is configured for introducing a molding material to the molding cavity so as to form a component in the molding cavity and a runner in the runner channel. The runner is connected with the component. The eject pin penetrates the first mold half and extends to the molding cavity. The eject pin is configured for ejecting the component out of the molding cavity. The runner stripper can move vertically relative to the molding cavity for removing the runner from the component. The blocking member is coupled to the runner stripper and movable with the runner stripper. The blocking member has a blocking plate movable to a blocking position where the blocking plate facing towards the component. The blocking member is configured for blocking the component when the component is ejected out by the eject pin.

Other advantages and novel features of the present invention will become more apparent from the following detailed description of present embodiment when taken in conjunction with the accompanying drawings.

BRIEF DESCRIPTION OF THE DRAWINGS

Many aspects of the present apparatus for injection molding can be better understood with reference to the following drawings. The components in the drawing are not necessarily drawn to scale, the emphasis instead being placed upon clearly illustrating the principles of the present apparatus for injection molding. Moreover, in the drawings, like reference numerals designate corresponding parts throughout the several views.

DETAILED DESCRIPTION OF THE PRESENT EMBODIMENTS

Embodiments of the present injection apparatus for injection molding will now be described in detail below and with reference to the drawings.

Figure 2:
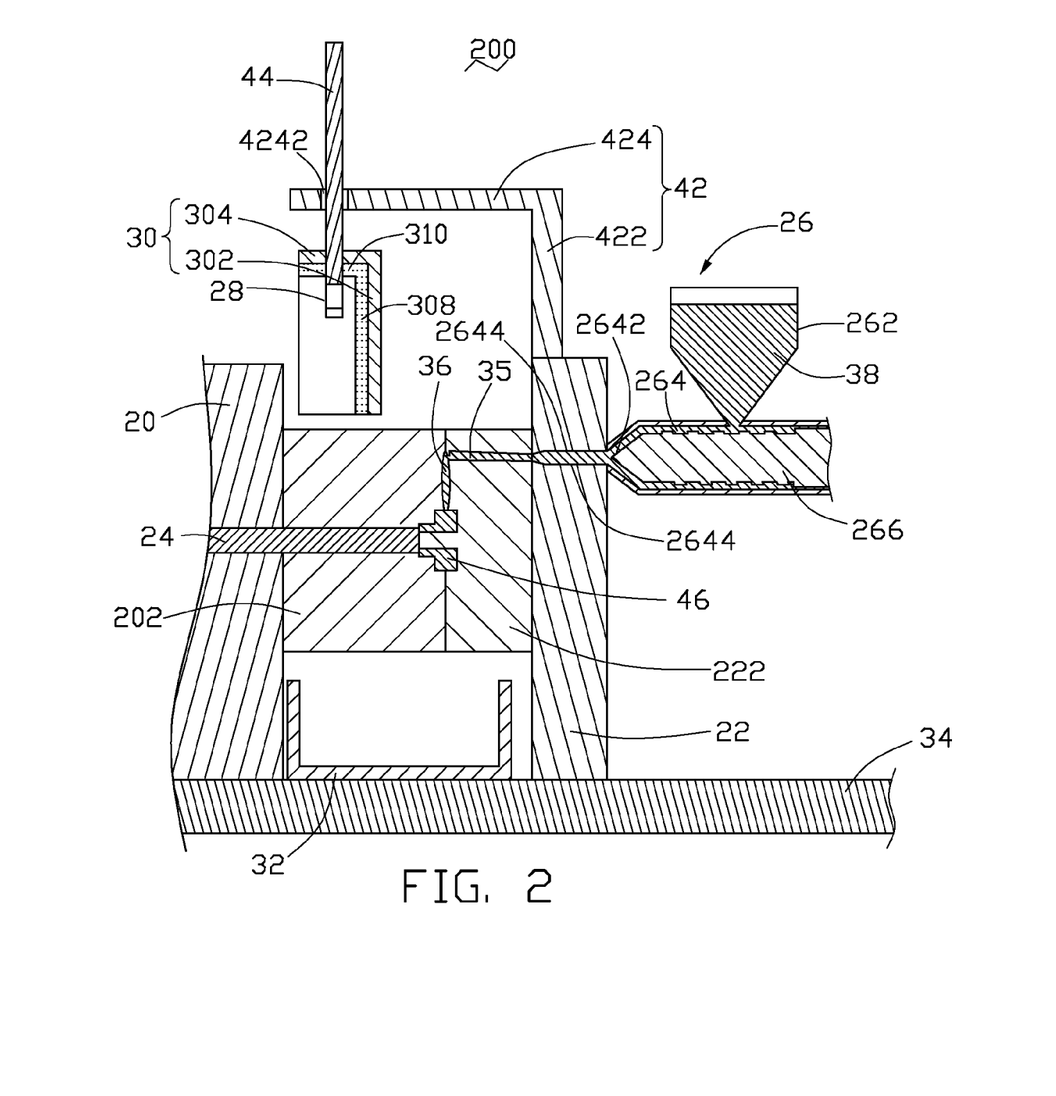
FIG. 2 is schematic, cross-sectional view of the injection molding apparatus in FIG. 1, wherein the cavity filled with injection material.

Referring to FIGS. 1 and 2, an injection molding apparatus 200 according to a first embodiment is shown. The injection molding apparatus 200 is used for injection molding a component 46. In the present embodiment, the molding component 46 is a lens barrel used in a camera. Alternatively, the molding component 46 could be a lens holder, a mobile phone shell, etc. The injection molding apparatus 200 includes a movable platen 20, a stationary platen 22 and an eject pin 24. The movable platen 20 and the stationary platen 22 are placed on a work table 34 and are moveable on the work table 34. A first mold half 202 and a second mold half 222 are attached to the movable platen 20 and the stationary platen 22 respectively. The first mold half 202 is opposite to the second mold half 222.

The first mold half 202 has a first molding surface 2022. The second mold half 222 has a second molding surface 2222. A post-shaped core 2224 protrudes from the second molding surface 2222. The first molding surface 2022, the second molding surface 2222 and the post-shaped core 2224 cooperatively define a molding cavity 33. The eject pin 24 penetrates through the first mold half 2022. A distal end of the eject pin 24 touches the post-shaped core 2224. A diameter of the side surface of the eject pin 24 is larger than that of the post-shaped core 2224. The injection molding apparatus 200 further includes an eject pin driver (not shown) for driving the eject pin 24.

A main runner 35 is defined in the second mold half 222. A branch runner 36 is formed between the first mold half 202 and the second mold half 222. The branch runner 36 is in flow communication with the main runner 35 and the molding cavity 33.

The injection molding apparatus 200 further includes an injection unit 26, a support stand 42, a stub bar stripper 28, a blocking device 30, and a receiving container 32. The injection unit 26 is a screw type injection unit. The injection unit 26 includes a hopper 262, a material passageway 264 and a screw type auger 266. The hopper 262 is configured for supplying injection material 38 for forming the molding component 46. The material passageway 264 is in flow communication with the hopper 262. The material passageway 264 defines a buffer storage area 2642 at one end thereof. The buffer storage area 2642 communicates with the main runner 35 through a sprue 2644. The screw type auger 266 is received in the material passageway 264 and can be driven to move along the passageway 264. Also, the screw type auger 266 can spin in the material passageway 264.

The support stand 42 includes a support 422 and a crossbeam 424. The support 422 is integrally connected with and perpendicular to the crossbeam 424. One end of the support 422 is fixed on the stationary platen 22. The support 422 is perpendicular to a top surface of the stationary platen 22. The crossbeam 424 defines a through hole 4242 therein along a direction perpendicular to the crossbeam 424. A driving pole 44 passes through the through hole 4242. The driving pole 44 is driven by a pole driver (not shown) to slide along the through hole 4242. Alternatively, the support 422 can incline to the top surface of the stationary platen 22. The support 422 can be attached to the movable platen 22, work table 34, etc.

Figure 3:
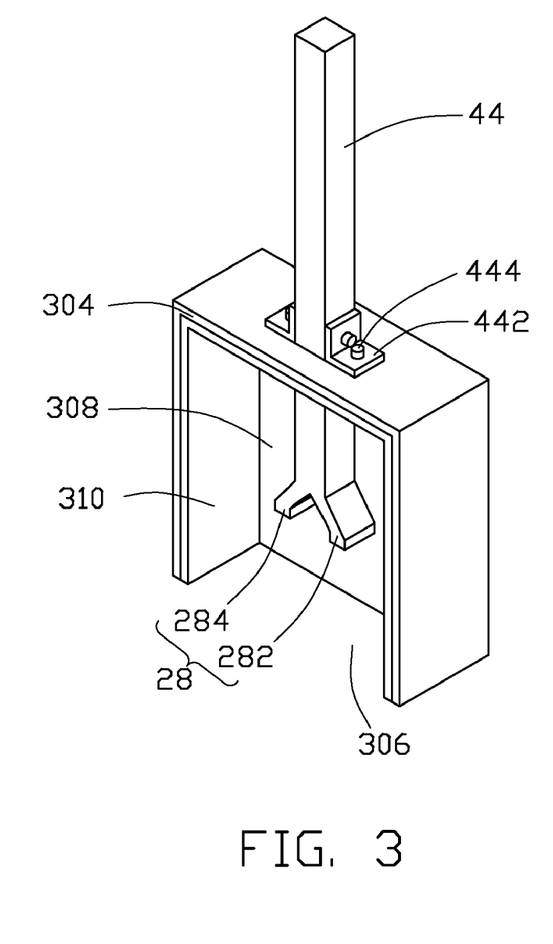
FIG. 3 is schematic, isometric view of stub bar stripper and a blocking device of the injection molding apparatus in FIG. 1.

With reference to FIG. 3, the stub bar stripper 28 is used for removing the stub bar (see stub bar 40 in FIG. 5) and disposing the stub bar 40 into a waste material collecting container (not shown). The stub bar stripper 28 is formed by two clamp portions 282 and 284. The top end portion of the stub bar stripper 28 connects with the driving pole 44. Thus, the stub bar stripper 28 can be driven by the driving pole 44. The two clamp portions 282 and 284 form a "V" shape for the convenience of clamping the stub bar 40. A material for making the stub bar stripper 28 can be selected from a group consisting of stainless steel, aluminum alloy and other rigid materials.

Referring to FIGS. 1 to 3, the blocking device 30 includes a rectangle blocking plate 302 and three side panels 304. The blocking plate 302 has four sides (not labeled) and the three side panels 304 protrude from one surface and adjacent to three of the four sides of the rectangle blocking plate 302, thus a gap 306 is defined at the remaining side of the blocking plate 302. Preferably, the side panel 304 is perpendicular to the rectangle panel 302. A first buffer layer 308 is attached on the surface of the blocking plate 302 where the side panels 304 protrude. A second buffer layer 310 is attached on one surface of each of the side panel 304. The second buffer layer 310 is disposed adjacent to the first buffer layer 308. A material for making the blocking plate 302 and the side panels 304 can be selected from aluminum, iron, plastic materials, etc. A material for making the first buffer layer 308 and the second buffer layer 310 can be selected from rubber foam, plastic foam, cotton, cloth, silica gel, etc. When the molding component 46 is ejected out from the molding cavity 33, the first buffer layer 308 faces towards the first mold half 202. The first buffer layer 308 is configured for blocking and buffering the molding component 46 during a knockout process of the injection molding apparatus 200. The driving pole 44 is inserted through and attached to the side panel 304 and the second buffer layer 310 facing towards the gap 306. The driving pole 44 and the side panel 304 are attached to each other via two angle irons 442. Wherein two arms of each angle iron 442 are attached to the driving pole 44 and the side panel 304 via two bolts 444 respectively. It is to be understood that the angle iron 442 also can be an angle aluminum, etc.

The receiving container 32 is a box-like collector with an opening defined therein. A material for making the receiving container 32 can be selected from a group consisting of plastic, aluminum alloy, iron, etc. The receiving container 32 is placed at one side of and below the second mold half 222. The receiving container 32 is used for collecting the lens barrel 46 after the lens barrel 46 is ejected out of the first mold half 202.

The injection molding apparatus 200 also can be a multi-cavity injection molding apparatus which can mold a plurality of lens barrels 46 at a time. Correspondingly, a plurality of branch runners is required for the main runner 35 to communicate with the branch mold cavities.

Figure 4:
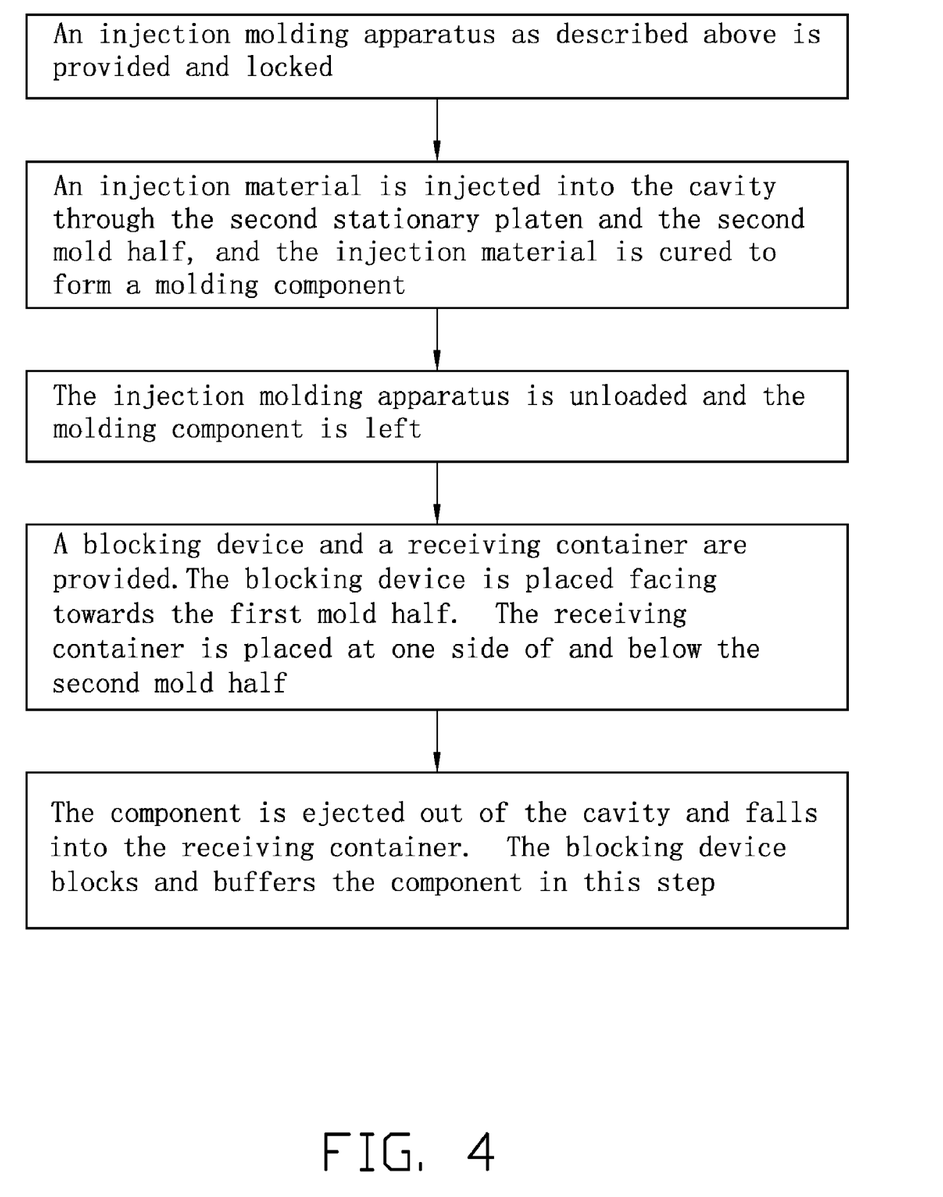
FIG. 4 is a flow chart of an injection molding method applying the injection molding apparatus of FIG. 1 according to a second embodiment.

Referring to FIG. 4, an injection molding method using the injection molding apparatus 200 includes following steps:

Step 1: an injection molding apparatus as described above is provided and locked.

Step 2: an injection material is injected into the cavity through the second stationary platen and the second mold half, and the injection material is cured to form a molding component.

Step 3: the injection molding apparatus is unloaded and the molding component is left in the first mold half.

Step 4: a blocking device and a receiving container are provided. The blocking device is placed facing towards the first mold half. The receiving container is placed at one side of and below the second mold half.

Step 5: the component is ejected out of the cavity and falls into the receiving container. The blocking device blocks and buffers the component in this step.

Referring to FIGS. 1 to 3, and 5 to 7, the injection molding method using the injection molding apparatus 200 is described in detail as follows.

Referring to FIG. 1, in step 1, the injection molding apparatus 200 includes a first stationary platen 20, a second stationary platen 22, a first mold half 202 and a second mold half 222. The first mold half 202 and the second mold half 222 are attached to the first stationary platen 20 and the second stationary platen 22 respectively. The first mold half 202 cooperates with the second mold half 222 to form a molding cavity 33 therebetween.

In step 2, the screw type auger 266 in the material passageway 264 spins to feed the injection material 38 to the buffer storage area 2642. There is a distance between the end of the screw type auger 266 and the hopper 262.

Referring to FIG. 3, the screw type auger 266 is driven towards the buffer storage area 2642. Thus the injection material 38 in the buffer storage area 2642 is injected into the molding cavity 33 through the main runner 35 and the branch runner 36. Then the molding cavity 33 is filled with the injection material 38.

The injection material 38 in the molding cavity 33 is cured by cooling, thus a molding component 46 is molded. The injection materials 38 in the main runner 35 and the branch runner 36 are cured to form a stub bar 40.

Figure 5:
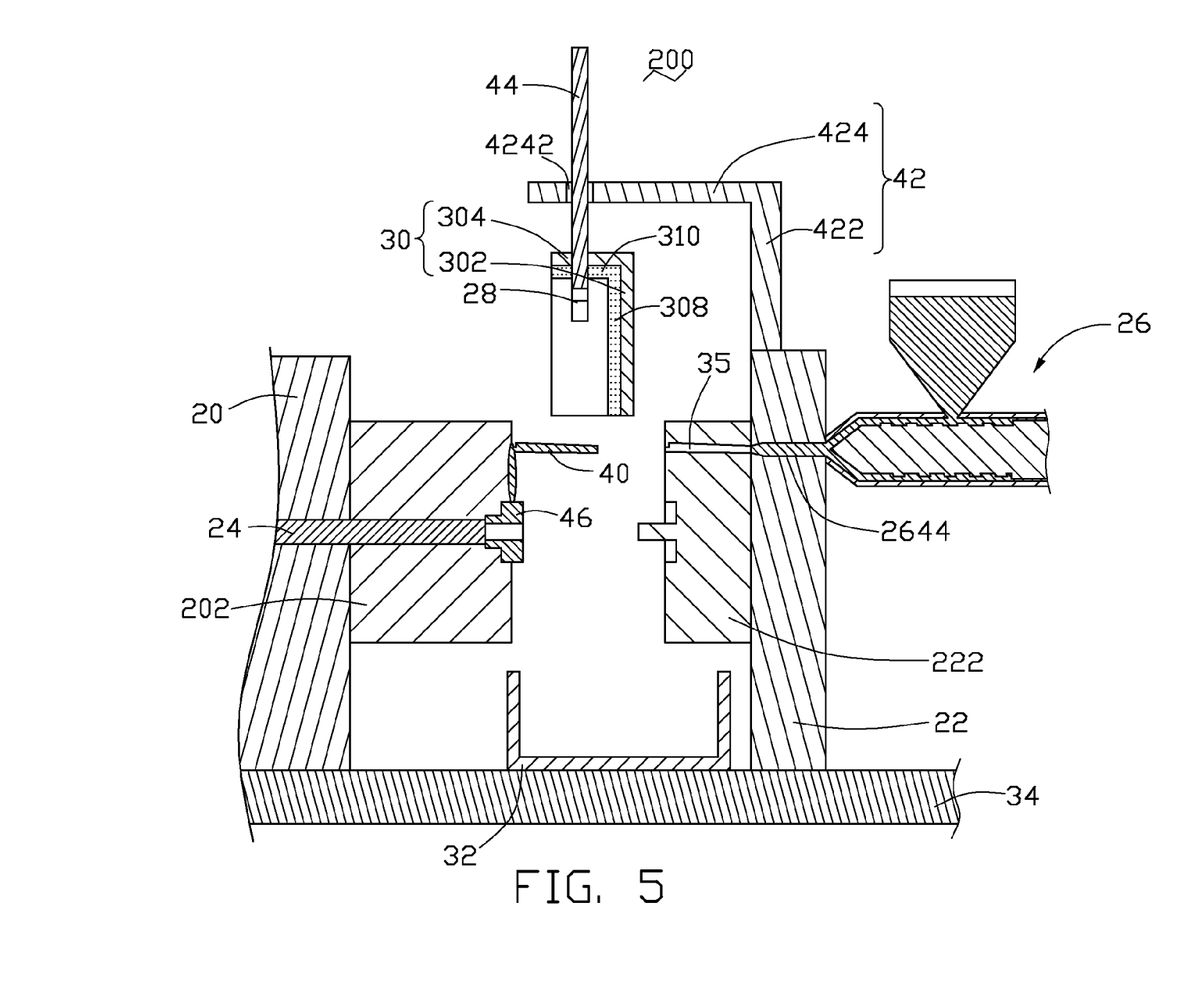
FIG. 5 is schematic, cross-sectional view of the injection molding apparatus of FIG. 1 in an unloading mold state.
Figure 6:
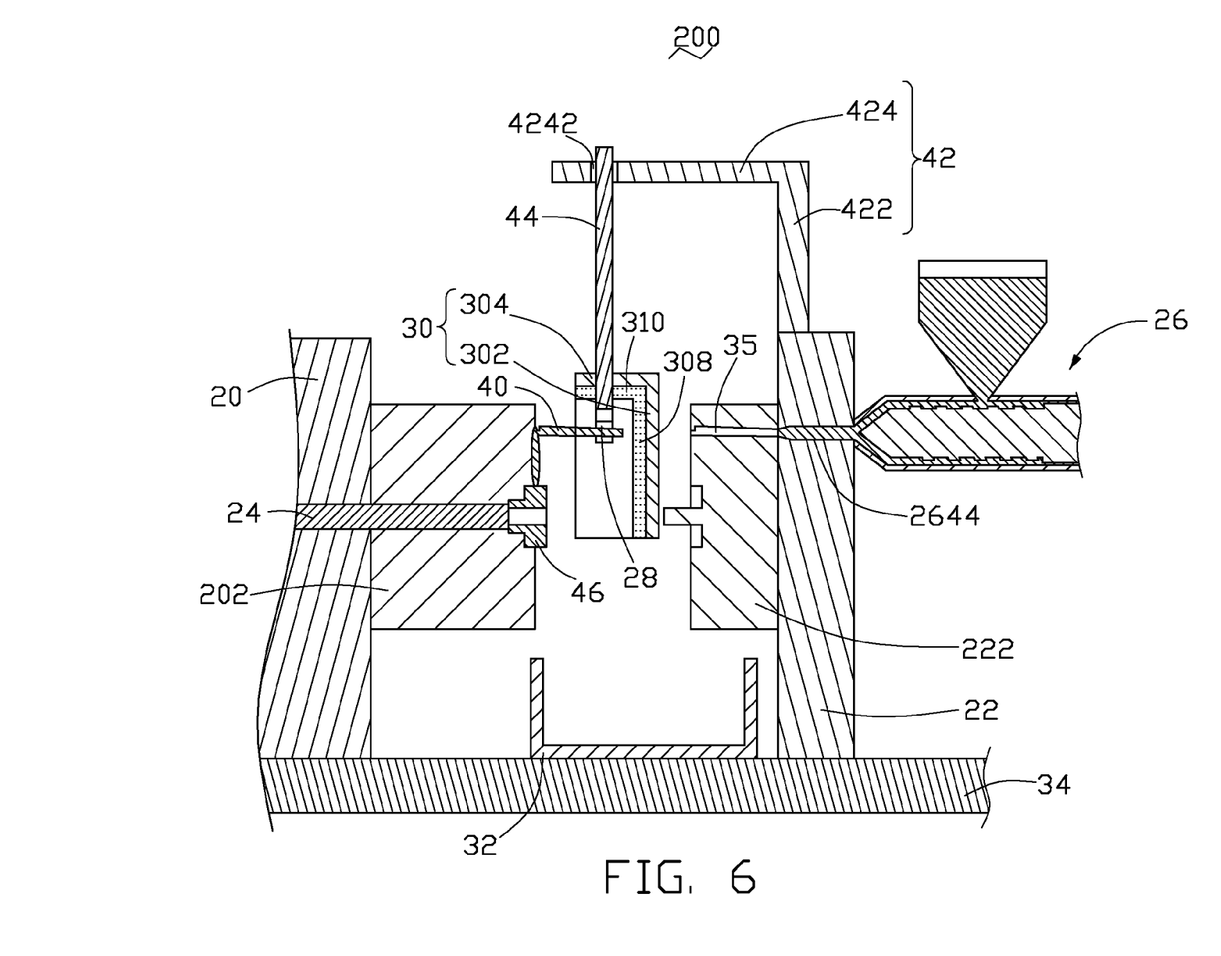
FIG. 6 is schematic, cross-sectional view of the injection molding apparatus of FIG. 1 when the stub bar stripper is cropping a stub bar.

Referring to FIG. 6, in step 3, the injection molding apparatus 200 is unloaded. The first mold half 202 moves away from the second mold half 222. The molding component 46 is left in the first mold half 202. The stub bar 40 is connected with the molding component 46. Referring to FIGS. 3, 5 and 6, the stub bar stripper 28 is driven by the driving pole 44 to remove the stub bar 40. Then the stub bar 40 is cropped and disconnected from the molding component 46 by the stub bar stripper 28 and disposed to the waste material collecting case.

In step 4, a blocking device 30 and a receiving container 32 are provided. The blocking device 30 is placed facing towards the first mold half 202. The structure of the blocking device 30 is described in the first embodiment in detail. The receiving container 32 is placed at one side of and below the second mold half 222.

Figure 7:
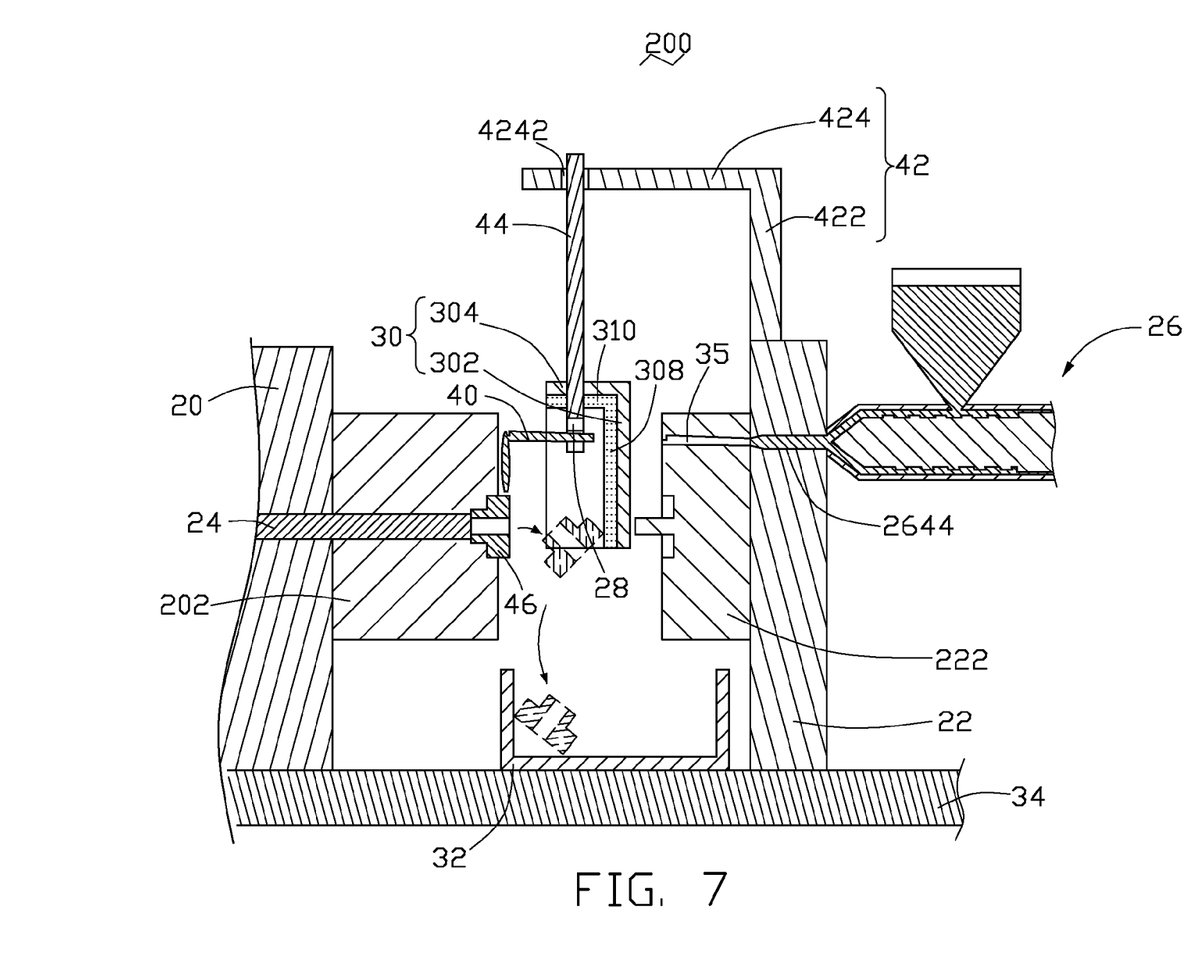
FIG. 7 is schematic, cross-sectional view of a knockout process of the injection molding method of FIG. 4.

Referring to FIG. 7, in step 5, the molding component 46 is ejected out of the first mold half 202 by the eject pin 12 and, then is blocked by the first buffer layer 308, finally falls into the receiving container 32. Preferably, the blocking device 30 is placed over the receiving container 32.

In the injection molding method, the injection apparatus 200 also can be an injection molding apparatus without stub bars. Accordingly, the step of removing the stub bar 40 can be omitted. In addition, the screw type auger 266 can also be replaced by a plunger type auger, not limited to the present embodiment.

In the practical knockout process, the component may fall into the receiving container 32 without hitting the first buffer layer 308. Additionally, the blocking device 30 also can be other structures, e.g. a single blocking plate with a buffer layer attached to one surface thereof, etc.

One of advantages of the injection molding method is to prevent the molding component 46 from being disposed beyond the receiving container 32 during the knockout process. Thus, decrease the chances of breaking the molding component 46.

Figure 8:
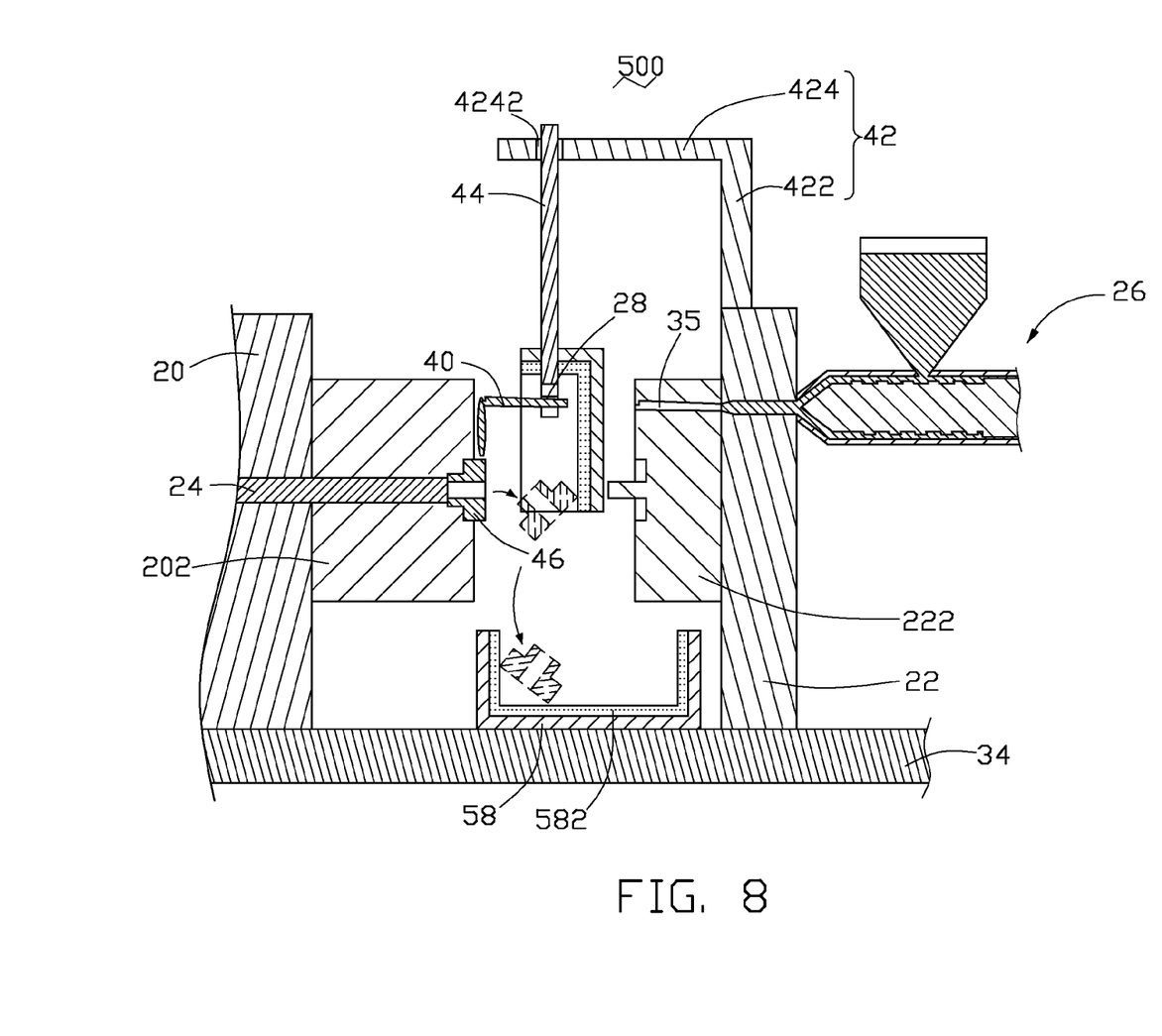
FIG. 8 is schematic, cross-sectional view of another injection molding apparatus according to a third embodiment.

Referring to FIG. 8, another injection molding apparatus 500 is illustrated in accordance to the third embodiment. The injection molding apparatus 500 is similar to the injection molding apparatus 200. The difference between the two injection molding apparatus 500 and 200 is that the injection molding apparatus 500 includes a receiving container 58 with a buffer layer 582 covered on the inner surface thereof. A material of the buffer layer 582 can be selected from rubber foam, plastic foam, cotton, cloth, silica gel, etc.

It is understood that the above-described embodiment are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. An injection molding apparatus for injection molding a component, comprising:
 a first mold half;
 a second mold half opposite to the first mold half;
 an eject pin penetrating through the first mold half;
 a receiving container placed below the first mold half and the second half, the receiving container being configured for receiving the molding component;
 a stub bar stripper vertically movable relative to the molding cavity for removing a stub bar from the molding component, the stub bar stripper being Y-shaped and having an elongated stem and two arms extending from a bottom end of the stem; and
 a blocking device moveable relative to the first mold half to face toward the first mold half, the blocking device being configured for blocking the molding component when the eject pin ejects the molding component out from the first mold half, the blocking device comprising a rectangular blocking plate and three side panels, the side panels protruding from three sides of the rectangular blocking plate, the side panels extending towards the first mold half, the stem of the Y-shaped stub bar stripper extending through and fixed to one of the side panels.

2. The injection molding apparatus as described in claim 1, wherein the blocking device further comprises a buffer layer arranged on the blocking plate.

3. The injection molding apparatus as described in claim 2, wherein a material of the buffer layer is selected from the group consisting of rubber foam, plastic foam, cotton, cloth, and silica gel.

4. The injection molding apparatus as described in claim 1, wherein a material of the blocking plate is selected from the group consisting of aluminum and iron.

5. The injection molding apparatus as described in claim 1, wherein the side panels are perpendicular to the blocking plate.

6. The injection molding apparatus as described in claim 1, wherein the receiving container includes a buffer layer formed on an inner surface thereof.

7. The injection molding apparatus as described in claim 6, wherein a material of the buffer layer is selected from the group consisting of rubber foam, plastic foam, cotton, cloth, and silica gel.

8. The injection molding apparatus as described in claim 1, further comprising a support stand, the support stand comprising a support and a crossbeam, the support being fixed on the second mold half and being perpendicular to a top surface of the second mold half, the crossbeam being integrally connected with and perpendicular to the support, the crossbeam defining a vertical through hole therein, a driving pole passing through and being slidable in the through hole, and a top end of the stem being connected with the driving pole.

9. An injection molding apparatus for injection molding a component, comprising:
 a first mold half;
 a second mold half opposite to the first mold half, the first mold half and the second mold half cooperatively defining a runner channel and a molding cavity in communication with the runner channel, the runner channel being configured for introducing a molding material to the molding cavity so as to form a component in the molding cavity and a runner in the runner channel, the runner being connected with the component;
 an eject pin penetrating the first mold half and extending to the molding cavity, for ejecting the component out of the molding cavity;
 a runner stripper vertically movable relative to the molding cavity for removing the runner from the component, wherein the runner stripper is Y-shaped and has an elongated stem and two arms extending from a bottom end of the stem; and
 a blocking member coupled to the runner stripper and jointly movable with the runner stripper, the blocking member comprising a blocking plate movable to a blocking position where the blocking plate faces toward the component, the blocking plate configured for blocking the component when the component is ejected out by the eject pin, the blocking member further comprising an upper plate adjacent to the blocking plate, the stem of the Y-shaped runner stripper extending through and being fixed to the upper plate.

10. The injection molding apparatus as described in claim 9, wherein the blocking member includes a cushion layer formed on the blocking plate.

11. The injection molding apparatus as described in claim 9, further comprising a support stand, the support stand comprising a support and a crossbeam, the support being fixed on the second mold half and being perpendicular to a top surface of the second mold half, the crossbeam being integrally connected with and perpendicular to the support, the crossbeam defining a vertical through hole therein, a driving pole passing through and being slidable in the through hole, and a top end of the stem being connected with the driving pole.

* * * * *